US005237729A

United States Patent [19]

Martin

[11] Patent Number: 5,237,729

[45] Date of Patent: Aug. 24, 1993

[54] BRAKE SPRING APPLICATION DEVICE

[76] Inventor: John Martin, 356 Crystal Springs Rd., Eight Mile, Ala. 36613

[21] Appl. No.: 880,028

[22] Filed: May 8, 1992

[51] Int. Cl.[5] .................... B23D 19/04

[52] U.S. Cl. .................... 29/227; 29/267

[58] Field of Search .................... 29/225, 227, 233, 270, 29/271, 267; 254/131, 10.5, 25; 7/100

[56] References Cited

U.S. PATENT DOCUMENTS

| | | | |
|---|---|---|---|
| 2,121,129 | 6/1938 | Malone | 29/267 |
| 2,863,635 | 12/1958 | Fandrich | 254/25 |
| 3,915,431 | 10/1975 | Castoe | 254/131 |
| 4,976,022 | 12/1990 | Thornton et al. | 29/267 |
| 5,003,680 | 4/1991 | Vesely et al. | 29/227 |
| 5,014,409 | 5/1991 | Hippach | 29/267 |
| 5,095,603 | 3/1992 | Carruthers et al. | 29/227 |

*Primary Examiner*—Robert C. Watson
*Attorney, Agent, or Firm*—Gregory M. Friedlander

[57] ABSTRACT

A device for removing or applying a brake spring having a hook onto a pin which device has a handle for providing leverage which curves to reverse the direction of force applied to the handle and to allow the device to fit over and around the pin which is to hold the brake spring. The curved portion defines a groove to engage the pin and allows the pin to act as the fulcrum of the device. The curved portion also acts to engage the spring and guide the spring onto the pin as well as holding the spring at a non-interfering distance from the bar while the spring is raised over the bar. The spring arm is of the same width or smaller than the spring hook so that the spring hook can fit over the spring arm.

8 Claims, 2 Drawing Sheets

BRAKE SPRING APPLICATION DEVICE

BACKGROUND OF THE INVENTION

1. Field of Invention

The invention described herein applies to leveraged tools.

More particularly the invention described herein applies to leveraged tools for releasing or applying springs.

More particularly this device applies to inventions for tensing brake springs onto truck brakes in a vehicle having a bar in the brake for applying the spring.

2. Prior Art

The prior art shows several inventions directed to the application of brake springs using leverage.

These provide for notches or ridges for attaching the spring prior to applying the spring by way of a notch attached to a lever.

Several of these inventions are potentially adaptable to applying brake springs to trucks or are directed towards that end.

The prior art shows several devices for applying or removing brake shoes. Examples are 2,666,256 issued to White, 2,839,820 issued to Bater, and 4,063,342 issued to Mitchell.

As shown in Vectin 2,685,731 4,063,342 issued to Mitchell the concept of a grooved slot for receiving a spring coil is old art. Several patents such as 2,321,263 show a leveraged arm to apply a This prior art envisions a spring intended to be mounted on an anchor pin. Cranks have been used in order to lift the spring into position as with U.S. Pat. No. 2,839,820 where the crank serves to rotate around the axis of the anchor pin. This requires the pin be open for receiving the crank. There is a separate arm for receiving the spring. The lever must be put in place in a narrow area after the staff is put in place on the pin.

The devices available in the prior art for tensing and applying brake shoes discussed above do not provide all of the features necessary to easily change brake shoes on trucks.

Because these require fairly regular service, there has been a long need for a product which would allow for the easy removal in a wide range of locations.

Another major difficulty with the prior art is the need to manipulate, at a distance, moving parts. Another difficulty not solved is the inability of existing spring tensing devices to be inserted around an existing hardware to put the spring in place.

One of the major problems with the prior art is that it does not allow for the lever arm to be easily placed on the recessed spring mounting arm which is typically behind metal plates. The metal plates may serve to prevent the spring from becoming dislodged during operation and in order to serve as a mounting place for the bar to which the spring attaches.

Another problem with the prior art is that it is difficult to learn to use.

Another problem with the prior art is inability to raise the spring in a way where the spring does not interfere with the raising means.

GENERAL DESCRIPTION OF THE INVENTION

The present invention addresses the problems of the prior art by allowing for the present invention to have an open, direction reversing curve with levers on either side of the curve. Because the direction reversing curve is open it can be maneuvered around the various parts in order to get the invention in place on the spring bar.

In addition, the direction reversing mechanism allows for leverage to be applied in an opposite direction or in a different direction from the direction which the spring arm applies lever age to the spring. In addition the direction reversing mechanism provides for a shorter arm is the restricted area where the leverage is applied.

In order to accomplish this, on either side of the direction reversing mechanism there is a separate lever arm. Both of these lever arms are part of a single tool lever and both lever arms have the same fulcrum corresponding to the notch which sits on the spring bar at the end of the spring lever arm.

It is therefore another object of the invention to provide a mechanism for controlling a spring lever with a second lever arm portion by virtue of a direction reversing means located between two lever arm portions and where one lever arm portion is at a different angle than the other lever arm portion relative to the fulcrum.

It is a further object of the invention to provide an improved means for applying brake springs to a recessed bar.

It is the further object of the invention to provide a brake spring application device which allows for leverage to be applied in one direction while the spring is tensed in another direction by virtue of a direction reversing curve applied in the lever arm.

It is the further object of the invention to provide an inexpensively manufactured device for applying brake springs with a high degree of durability.

Other objects and advantages of the invention will become better understood hereinafter from a consideration of the specification with reference to the accompanying drawings forming part thereof, and in which like numerals correspond to parts throughout the several views of the invention.

DETAILED DISCUSSION OF THE PREFERRED EMBODIMENT(S)

Figure 1:
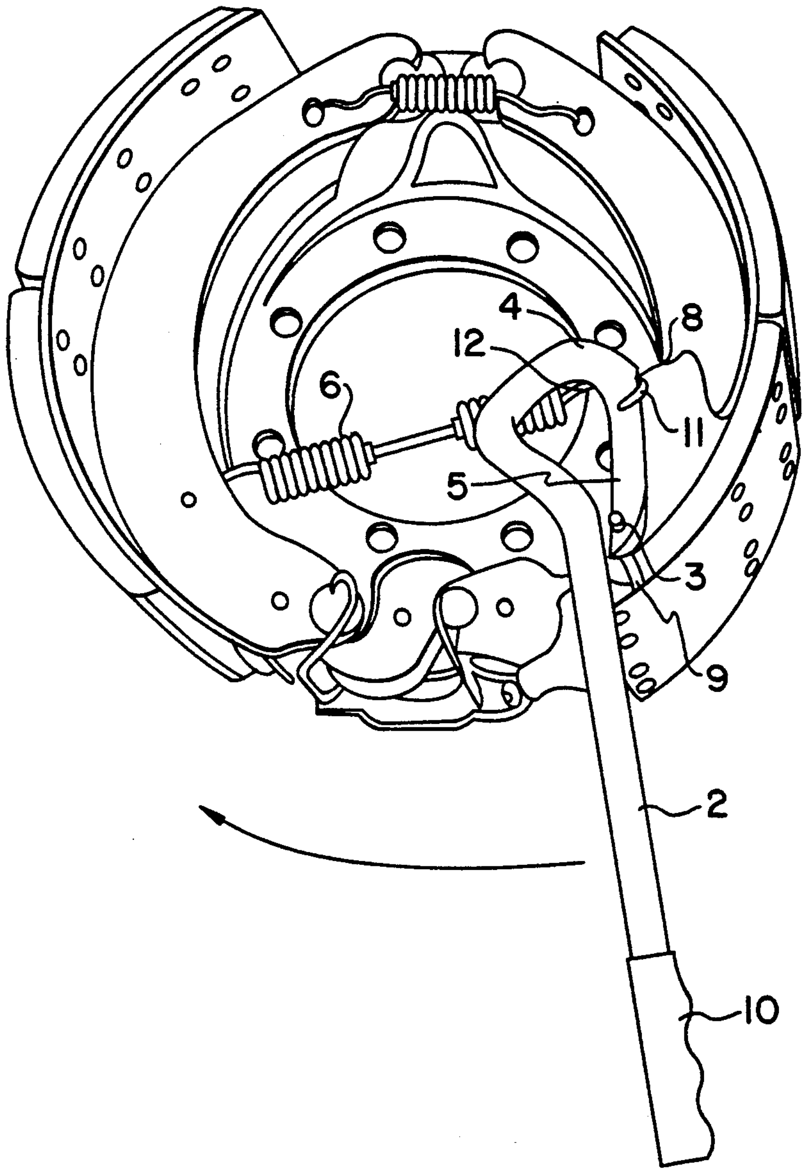
FIG. 1 is a perspective view of the tool in place on a brake where the notch is on the spring arm.
Figure 2:
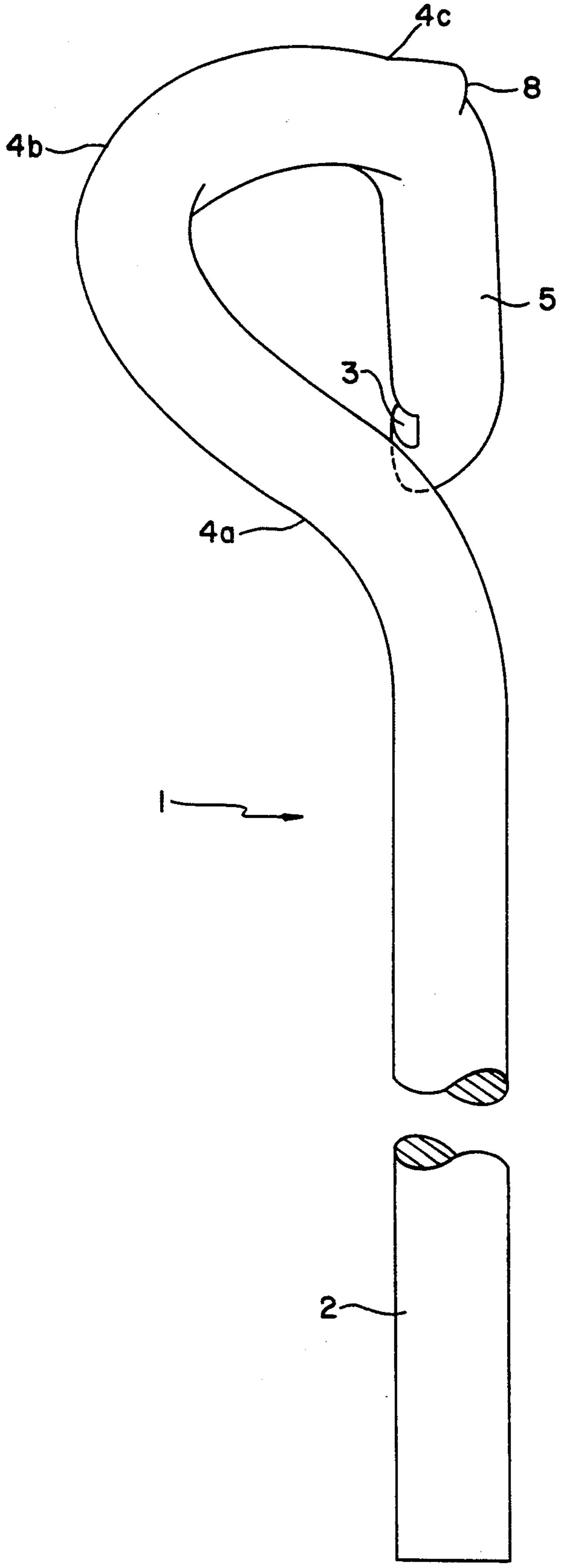
FIG. 2 is a perspective view of the tool.

As shown in FIG. 1, the invention, has a long leverage arm 2. This long leverage arm 2 can be of any length, but in the preferred embodiment is approximately 6 to 18 inches which gives it a long moment and is also be short enough to be easily handled. The near end has a grip 10.

In order to hold the arm 2 in position, at the far end of the tool 1 is a notch 3. The notch 3 is defined by the end with a spring lever arm 5 located at one end of the direction changing or reversing means 4 which will be discussed in more detail below.

The direction reversing means 4 is attached to a spring arm 5. The purpose of the reversing means 4 and spring arm 5 are to provide a smaller levered arm 5 in the restricted area and in the right direction for raising the spring 6. These spring arms are typically 3 inches. The spring arm 5 is from ½ inch to ¾ inch in diameter. If smaller, the hook 11 of the spring 6 would hit the brake pin 9. This is because the spring arm 5 serves as a means for keeping the hook 11 elevated above the pin 9.

The size of the spring arm provides for the arm 12 attaching the spring hook 11 of the spring 6 to hit the pin 9. This causes the open end of the spring hook 11 to swing around and swing onto the pin 9. If the spring arm 5 is larger than $\frac{3}{4}$ inch it is difficult to put the hook on and the hook sits above the spring arm 5 as opposed to going over the spring arm 5 and this inhibits the spring hook 11 fitting over the bar 9 and also inhibits the function of the groove on knob 8, described in more detail below, from holding the spring hook 11 as the spring 6 is raised over the pin 9.

The spring arm 5 allows the spring 6 to be levered into position.

The spring arm 5 allows for the spring 6 to be held at a low position and then as leverage is applied to the lever arm 2, the spring 6 is tensed and raised so that the hook of the spring 6 is raised above the bar 9. The shorter spring arm 5 is easily moved in the restricted area of the brake.

The knob 8 holds the spring 6 while it is being raised and releases the spring 6 once it has been fully raised above the bar 9. In the preferred embodiment the knob 8 is formed by a groove 8 carved at a decreasingly shallow cut in the spring arm 5 so that the groove 8 goes straight down into the spring arm 5 to prevent the spring from sliding backwards and then rises to the surface of the spring arm 5 as the groove 8 moves toward the notch 3 in the far end of the spring arm 5.

As shown in FIG. 1 the notch 3 fits over a metal bar 9 which is also the point of attachment for the brake spring 6 to be applied.

Once the notch 3 is in place on the bar 9 the spring arm 5 is lowered to a point where the spring 6 can be hooked onto a raised knob 8 or indentation on the spring arm 5. The purpose of this knob 8 is to hold the spring 6 at the removed position from the notch 3 and bar 9 while the spring 6 is tensed as leverage is applied by way of the lever arm 2.

A bend 4 reverses the direction at which leverage is applied. This bend 4 is designed in order to allow the leverage of a long lever arm 2 to be applied in the narrow area in which the tool 1 operates. As best seen by FIG. 1, the curve or bend 4 curves go out and then turns parallel to the direction of the lever arm 2. In the preferred embodiment the bend 4 reverses the direction approximately 180 degrees. The bend 4 comprises an initial outward bend 4*a* from the handle 2. The outward bend then turns at an angle of approximately 90 degrees and outward from the direction of the handle 2 and in the approximate opposite direction from the outward bend 4*a* in a perpendicular bend 4*b*. The perpendicular bend 4*b* is followed by short straight section 4*c* and then a returning bend 4*d*. These bends allow for the bend 4 to define an open hook to allow the spring arm 5 to be inserted over the bar 9. The open hook formed by the direction reversing bend 4 is a means to allow for the leverage from the lever arm 2 to be applied in an opposite direction to spring arm 5 over an intervening bar 9.

As can be seen by close examination of the drawings and by the description given herein when the notch 3 is in position on the bar 9 and the lever arm 2 is moved away from the bar 9, the knob 8 of the spring arm 5 holding the spring moves up relative to the notch 3 end of the bar 9. At a given height when the hook 11 is above the bar 9, the tens of the spring 6 overcomes the friction and the groove downward is raised to become an upward groove 8 and the spring 6 slides onto the bar 9.

The curve 4 allows for the direction of the leverage to be changed in order to accomplish this result.

The notch 3 is designed so that when the spring 6 is tensed and stretched above the bar 9 the spring 6 will automatically slip off the knob 8. To this end the distance of the knob 8 down the spring arm 5 and the shape of the knob 8 must be controlled so as to prevent the spring 6 from slipping off at an earlier point in time, but to hold the spring 6 until the right period of time has passed.

The curved portion 4 is small enough to be maneuvered within a tight space. The notch 3 can be watched through a view port or applied by feel as it is deep enough to catch with some certainty.

I claim:

1. A device for removing or applying a brake spring having a hook on a pin wherein said hook has an open end and a closed end comprising:

(a) handle extensions means for providing leverage having a grip end and a connecting end;

(b) reversing means attached to the connecting end for changing the direction of application of the leverage from the handle extension means and for raising the spring over a pin;

(c) a pin engaging means for engaging the pin on which the spring is to be mounted and guiding the spring hook onto the pin which pin engaging means comprises a spring arm means for holding the spring at a non-interfering distance from the bar while the spring is raised and wherein the spring arm is of the same width or smaller than the spring hook so that the spring hook can fit over the spring arm and wherein the spring arm defines a notch for receiving the bar and holding the spring arm in place on the bar.

2. The device of claim 1 wherein the spring arm extends above the notch a sufficient distance to hold the open end of the spring hook above the bar as the spring moves over the bar so that the closed end of the spring hook contacts the bar and the open end of the spring hook can twist over the bar and wherein the spring arm extends only a short distance past the bar so that the spring hook can fall off of the spring arm onto the bar after twisting over the bar so as to be in place on the bar.

3. The device to claim 1 further comprisings:

(d) hook engaging means for releasably holding the spring hook as the hook is raised above the pin.

4. The device of claim 3 wherein the hook engaging means further comprises a groove means for holding the spring while it is raised and releasing the spring when it is sufficiently raised so that the spring hook will slide along the pin engaging means to fit over the pin.

5. The device of claim 1 wherein the reversing means comprises an open curve and wherein the open curve reverses the direction between ninety and two hundred and seventy degrees and wherein the curve defines an opening so that a gap is formed between the handle extension means and the hook engaging means.

6. The device of claim 5 wherein the reversing means further comprises an outward bend, a perpendicular bend and a returning bend with each bend being gradual and defining an opening between the pin engaging means and the handle extension means.

7. The device of claim 6 wherein the handle extension means comprises a lever arm attached to the reversing means opposite the hook engaging means.

8. The invention of claim 7 wherein the spring arm is shorter than the lever arm.

* * * * *